US010422927B2

(12) United States Patent
Richardson et al.

(10) Patent No.: US 10,422,927 B2
(45) Date of Patent: Sep. 24, 2019

(54) METHOD OF MANUFACTURING SILICONE HYDROGEL CONTACT LENSES HAVING REDUCED RATES OF EVAPORATION

(71) Applicant: CooperVision International Holding Company, LP, St. Michael (BB)

(72) Inventors: Paul Richardson, San Ramon, CA (US); Nancy J. Keir, Pleasanton, CA (US); Xinfeng Shi, Fremont, CA (US); James Mun, Dublin, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 200 days.

(21) Appl. No.: 15/624,723

(22) Filed: Jun. 16, 2017

(65) Prior Publication Data

US 2018/0017712 A1    Jan. 18, 2018

Related U.S. Application Data

(60) Provisional application No. 62/362,283, filed on Jul. 14, 2016.

(51) Int. Cl.
*G02B 1/04* (2006.01)

(52) U.S. Cl.
CPC .................................. *G02B 1/043* (2013.01)

(58) Field of Classification Search
CPC .................................................. G02B 1/043
See application file for complete search history.

(56) References Cited

U.S. PATENT DOCUMENTS

| | | | |
|---|---|---|---|
| 4,143,949 A | 3/1979 | Chen | |
| 5,158,717 A * | 10/1992 | Lai | B29C 33/40 249/134 |
| 5,760,100 A | 6/1998 | Nicolson et al. | |
| 6,551,531 B1 | 4/2003 | Ford et al. | |
| 6,867,245 B2 | 3/2005 | Iwata et al. | |
| 7,572,841 B2 | 8/2009 | Chen et al. | |
| 7,582,327 B2 | 9/2009 | Qiu et al. | |
| 7,750,079 B2 | 7/2010 | Almond et al. | |
| 7,841,716 B2 | 11/2010 | McCabe et al. | |
| 7,854,866 B2 | 12/2010 | Atkinson et al. | |
| 8,129,442 B2 | 3/2012 | Ueyama et al. | |
| 8,231,218 B2 | 7/2012 | Hong et al. | |
| 8,614,261 B2 | 12/2013 | Iwata et al. | |
| 8,658,747 B2 | 2/2014 | Liu et al. | |
| 8,820,928 B2 * | 9/2014 | Back | C08L 83/04 351/159.73 |
| 8,865,789 B2 | 10/2014 | Yao et al. | |
| 8,979,261 B2 | 3/2015 | Goodenough et al. | |
| 9,156,214 B2 | 10/2015 | Norris et al. | |
| 2003/0052424 A1 | 3/2003 | Turner et al. | |
| 2008/0290534 A1 | 11/2008 | Yin et al. | |
| 2009/0108479 A1 * | 4/2009 | Lai | B29C 33/40 264/2.6 |
| 2011/0085128 A1 * | 4/2011 | Liu | B29D 11/00038 351/159.34 |
| 2013/0188125 A1 * | 7/2013 | Goodenough | G02C 7/04 351/159.33 |
| 2014/0200286 A1 | 7/2014 | Manesis et al. | |
| 2016/0159019 A1 * | 6/2016 | Bruce | B29D 11/00038 351/159.33 |

FOREIGN PATENT DOCUMENTS

| | | |
|---|---|---|
| CA | 2947829 A1 | 11/2015 |
| EP | 2483737 B1 | 7/2016 |
| WO | 2012016152 A1 | 2/2012 |
| WO | 2013186573 A1 | 12/2013 |
| WO | 2017182817 A1 | 10/2017 |

OTHER PUBLICATIONS

International Search Report and Written Opinion issued in corresponding International Patent Application No. PCT/GB2017/052064 dated Jan. 10, 2018 (18 pages).
International Preliminary Report on Patentability issued in corresponding International Patent Application No. PCT/GB2017/052064 dated May 25, 2018 (17 pages).
Little et al., "Environmental Influences on Hydrogel Lens Dehydration and the Postlens Tear Film," ICLC, vol. 22, pp. 148-155, Jul./Aug. 1995.
Communication Relating to the Results of the Partial International Search Report dated Oct. 11, 2017 received in corresponding PCT Application No. PCT/GB2017/052064 (11 pages).
Examination Report issued in United Kingdom Patent Application No. GB1817210.6 dated Dec. 18, 2018 (4 pages).

* cited by examiner

*Primary Examiner* — Michael F Pepitone
(74) *Attorney, Agent, or Firm* — Kilyk & Bowersox, P.L.L.C.

(57) ABSTRACT

A wettable silicone hydrogel contact lens having a low ionoflux and low evaporation is manufactured by curing a silicone hydrogel polymerizable composition in a contact lens mold comprising front and back lens-forming surfaces, where one of the lens-forming surfaces has a higher polarity than the other lens-forming surface.

17 Claims, 1 Drawing Sheet

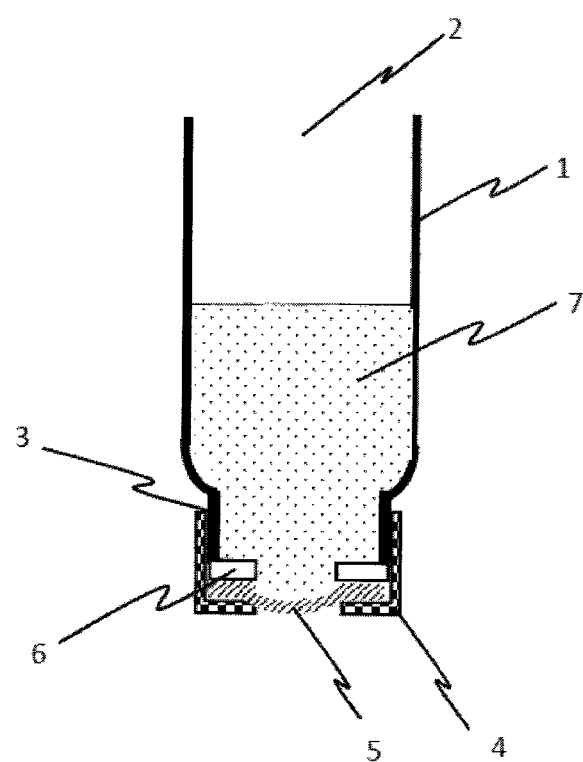

METHOD OF MANUFACTURING SILICONE HYDROGEL CONTACT LENSES HAVING REDUCED RATES OF EVAPORATION

This application claims the benefit under 35 U.S.C. § 119(e) of prior U.S. Provisional Patent Application No. 62/362,283, filed Jul. 14, 2016, which is incorporated in its entirety by reference herein.

FIELD

The field of the invention relates to silicone hydrogel contact lenses.

BACKGROUND

Silicone hydrogel contact lenses are typically made by co-polymerizing one or more silicone-containing monomers with one or more hydrophilic-containing monomers within a contact lens mold that shapes the front and back surfaces of the contact lens. After polymerization, the lens is removed from the mold and processed to hydrate and remove unreactive materials from the lens. Lenses may be subjected to further processes to increase the hydrophilicity of the surface of the contact lens. Typically the front (i.e. anterior) and back (i.e. posterior) surfaces of a contact lens have the same material properties. However, the two surfaces are exposed to very different environments. The front surface of a lens is exposed to the air-tear interface, where water from within the hydrogel lens is susceptible to evaporation. The back surface of the lens is exposed to the eye-cornea interface. It has been proposed that contact lens dehydration is induced by water evaporation at the anterior surface followed by water transport from the posterior to the anterior lens surface (see Little and Bruce, ICLC 22 (1995) 148-155), which can lead to thinning of post-lens tear film and in turn may lead to corneal epithelial cell damage, as evidenced by a fluorescein eye stain test. Contact lens discomfort is commonly associated with corneal staining.

New silicone hydrogel contact lenses that are less susceptible to dehydration, have reduced incidence of corneal staining, and are more comfortable for the wearer are desired.

Background publications include U.S. Pat. Nos. 6,551,531, 8,979,261, U.S. Publ. No. 2016/0159019, U.S. Publ. No. 2008/02950534, and U.S. Pat. No. 9,156,214.

SUMMARY

In one aspect, the invention provides a method of manufacturing a silicone hydrogel contact lens comprising providing a contact lens mold comprising a first lens-forming surface to mold one side of said hydrogel contact lens and a second lens-forming surface to mold the opposite side of said hydrogel contact lens, wherein the first lens-forming surface has a higher polarity than the second lens-forming surface; curing a polymerizable composition comprising at least one siloxane monomer and at least one hydrophilic monomer in the contact lens mold to form a polymeric lens body; hydrating the polymeric lens body to provide a silicone hydrogel contact lens having a first surface formed by the first lens-forming surface of the contact lens mold and a second surface formed by the second lens-forming surface of the contact lens mold; and sealing the silicone hydrogel contact lens in a package. In one example, the silicone hydrogel contact lens manufactured by the method has a lower ionoflux and/or a lower evaporation rate than a control contact lens manufactured by an identical method except that the second lens-forming surface has the same polarity as the first lens-forming surface.

In another aspect, the invention provides a silicone hydrogel contact lens comprising a polymeric lens body that is the reaction product of a polymerizable composition comprising at least one siloxane monomer and at least one hydrophilic monomer, wherein the silicone hydrogel contact lens has an ionoflux between $1.0 \times 10^{-6}$ mm$^2$/min and $0.5 \times 10^{-3}$ mm$^2$/min and a back surface contact angle of less than 45°.

In another aspect, the invention provides a silicone hydrogel contact lens comprising a polymeric lens body that is the reaction product of a polymerizable composition comprising at least one siloxane monomer and at least one hydrophilic monomer, wherein the silicone hydrogel contact lens has an ionoflux between $1.0 \times 10^{-6}$ mm$^2$/min and $0.5 \times 10^{-3}$ mm$^2$/min and an evaporation rate of less than 15 mg/h when measured at 21° C. to 23° C. at 48-50% RH for 2 to 4 hours.

BRIEF DESCRIPTION OF THE DRAWINGS

FIG. 1 depicts a device used to measure ionoflux of a silicone hydrogel contact lens.

DETAILED DESCRIPTION

Methods are described for manufacturing silicone hydrogel contact lenses that have low ionoflux and/or reduced evaporation rates. The method comprises curing a polymerizable composition comprising at least one siloxane monomer and at least one hydrophilic monomer in a contact lens mold comprising two lens-forming surfaces, where one lens-forming surface, referred to herein as "the first lens-forming surface", is more polar than the complementary (i.e. the second) lens-forming surface. The resulting silicone hydrogel contact lens has a lower ionoflux and/or reduced evaporation rate than a lens manufactured by the same method except that both lens-forming surfaces of the contact lens mold comprise the same "more polar" surface. The resulting lens is referred to herein as a "dual-surface lens" because the difference in polarity between the first and second lens-forming surfaces of the contact lens mold results in a contact lens having front and back surfaces with different physical properties.

Contact lens molds typically comprise two combinable parts, one part is referred to as the female mold member, which has a concave surface that defines the front (i.e. anterior) surface of the contact lens, and the other part is referred to as the male mold member, which has a convex surface that defines the back (i.e. posterior) surface of the contact lens. A polymerizable composition is dispensed into the female mold member and the male mold member is coupled to the female mold member to form a mold assembly having a lens-shaped cavity with the polymerizable composition therebetween. The mold assembly is then subjected to conditions that result in polymerization of the polymerizable composition.

The contact lens mold may be formed from any suitable material provided that the mold has a first lens-forming surface that is more polar than the second lens-forming surface. In one example, the first lens-forming surface has a percent polarity that is at least 3, 5, 10 or 15 percentage points higher than the percent polarity of the second lens-forming surface, and up to about 25, 30, 40, or 50 percentage points higher, where percent polarity of a molding material is determined by the Owens, Wendt, Rabel and Kaelble (OWRK) method. In one example, the first lens-forming surface of the contact lens mold forms the front surface of the contact lens. In another example, the first lens-forming surface of the contact lens mold forms the back surface of the contact lens. A first lens-forming surface of a contact lens mold is considered to be more polar than a second lens-forming surface of the contact lens mold if the first lens-forming surface has a lower contact angle than the second lens-forming surface. As used herein, the contact angle of a lens-forming surface of a contact lens mold is determined by the sessile drop method using a DSA-100 Drop Shape Analysis System from Krüss, or equivalent analyzer, using 3 µl PBS dropped at the center of the lens-forming surface. In one example the contact angle of the first lens-forming surface is at least 10°, 20°, or 30° lower than the contact angle of the second lens-forming surface. In another example, the first lens-forming surface is polar and the second lens-forming surface is non-polar. A lens-forming surface having a contact angle of 90° or less indicates a polar surface, and a lens-forming surface having a contact angle of greater than 90° indicates a non-polar surface. Throughout this disclosure, a reference to "an example" or "a specific example" or similar phrase, is intended to introduce a feature or features of the contact lens mold, polymerizable composition, method of manufacture, etc. (depending on context) that can be combined with any combination of previously-described or subsequently-described examples (i.e. features), unless a particular combination of features is mutually exclusive, or if context indicates otherwise.

In one example, the contact lens mold members are formed from a thermoplastic polymer. Each of the mold members may be formed from the same material or a different material. In examples where the mold members are formed from the same material, the lens-forming surface of one of the mold members may be coated or treated to provide a different surface polarity than the lens-forming surface of the other mold member. In one example, both mold members comprise a non-polar material. Examples of non-polar materials suitable for contact lens molds include polypropylene, cyclic olefinic polymers and copolymers, polyethylene, polystyrene, nylon polymers, and the like. In examples where both mold members comprise the same non-polar material, the first lens-forming surface of the contact lens mold may be treated to make the surface more polar than the second lens-forming surface. In one example the first lens-forming surface may be made more polar by treatment with air plasma, UV-ozone, or corona discharge. In another example, the first lens-forming surface may be coated with a hydrophilic coating. In a specific example, the first lens-forming surface comprises a non-polar thermoplastic material coated with a hydrophilic coating and the second lens-forming surface comprises the non-polar thermoplastic free of a polarity-enhancing surface coating or treatment.

A hydrophilic coating may comprise a hydrophilic polymer. Examples of hydrophilic polymers include polyvinyl alcohol (PVOH) homopolymers, PVOH copolymers, ethylene vinyl alcohol copolymers, polyethylene oxides, polyethylene oxide copolymers, polypropylene glycol, polyvinyl pyrrolidone, carboxymethyl cellulose, hydroxypropyl methyl cellulose, polyacrylic acid, chitosan, hyaluronic acid, and combinations thereof. A hydrophilic coating may be applied to the first lens-forming surface by any suitable coating method such spray coating, spin coating, dip coating, roll coating, curtain coating, chemical vapor deposition, and combinations thereof. Methods for applying hydrophilic coatings onto contact lens molds are described in U.S. Publ. No. 2016/0159019, which is incorporated herein by reference.

In some examples the second mold member is formed from a non-polar material, such as one of the above non-polar thermoplastic polymers, and the first mold member is made from a polar material. Examples of polar materials suitable for contact lens molds includes ethylene vinyl alcohol copolymers, polyamide, polyvinyl alcohol resins having a 1,2-diol structural unit, Nylon 6/6, Nylon 4/6, acetal resin, and polybutylene terephthalate. Additional polar mold materials suitable for contact lens molds are described in U.S. Pat. Nos. 8,979,261, and 9,156,214. In other examples, both mold members are formed from a polar material and the second lens-forming surface is treated to make the surface less polar than the first lens-forming surface. For example, the second lens-forming surface may be coated with a hydrophobic coating.

A polymerizable composition comprising at least one siloxane monomer and at least one hydrophilic monomer is dispensed into the contact lens mold and cured. The polymerizable composition, contact lens mold, and curing conditions are selected to provide a silicone hydrogel contact lens that has a lower ionoflux and/or a reduced evaporation rate compared to a control contact lens. As used herein, the term "control contact lens" refers to a contact lens made from the same polymerizable composition as the dual surface lens and manufactured by an identical method except that the second lens-forming surface of the contact lens mold for the control contact lens has the same polarity as the first lens-forming surface. For example, if a contact lens of the present invention is manufactured by curing a polymerizable composition in a polypropylene mold that has a PVOH coating on the first lens-forming surface and no coating on the second lens-forming surface (i.e. the second lens-forming surface is uncoated polypropylene), the same polymerizable composition when cured in a polypropylene mold having the PVOH coating on both the first and second lens-forming surfaces of the polypropylene contact lens mold will result in a control contact lens having a higher ionoflux and/or evaporation rate.

As used herein, the term "ionoflux" refers to the ionoflux diffusion coefficient value of a contact lens as determined by the method described in Example 1 below. In some examples, the ionoflux of the contact lens is at least $1.0 \times 10^{-6}$ mm$^2$/min, $2.5 \times 10^{-6}$ mm$^2$/min, or $5.0 \times 10^{-6}$ mm$^2$/min, and up to about $0.1 \times 10^{-3}$ mm$^2$/min, $0.25 \times 10^{-3}$ mm$^2$/min, $0.5 \times 10^{-3}$ mm$^2$/min, $0.75 \times 10^{-3}$ mm$^2$/min, or $1.0 \times 10^{-3}$ mm$^2$/min. In one example, the contact lens has an ionoflux of at least $1.0 \times 10^{-6}$ mm$^2$/min and up to $0.5 \times 10^{-3}$ mm$^2$/min, and the control contact lens has an ionoflux of greater than $1.0 \times 10^{-3}$ mm$^2$/min or greater than $2.0 \times 10^{-3}$ mm$^2$/min. Thus, in this example, the ionoflux of the control lens is more than twice that of the dual-surface lens.

The "evaporation rate", as used herein, refers to the average rate of evaporation in units of mg/hr through the contact lens for a given time period (e.g. 0 to 2 hours, 0 to 4 hours, 2 to 4 hours, etc.) as measured in vitro using the method described in Example 2 below. In one example, the contact lens has an evaporation rate of less than 20 mg/h, less than 18 mg/h, or less than 15 mg/h when measured at 21° C. to 23° C. at 38-40% RH from 0 to 4 hours. In another example, the contact lens has an evaporation rate of less than 15 mg/h or less than 12 mg/h when measured at 21° C. to 23° C. at 49-50% RH from 2 to 4 hours. In one example the contact lens has an evaporation rate that is no more than 90%, 85%, 80%, 75%, 70%, or 65% that of a control lens when measured at 21° C. to 23° C. at 38-40% RH for 0 to 4 hours.

The polymerizable composition comprises a siloxane monomer, which is a molecule containing at least one siloxane (Si—O—Si) group and at least one polymerizable group. In some examples the siloxane monomer may comprise two or more polymerizable groups, and thus has cross-linking functionality. Siloxane monomers useful in contact lens compositions are well-known in the art (see, e.g., U.S. Pat. Nos. 8,658,747, 6,867,245, 7,750,079, 7,572, 841, 8,614,261, 8,129,442, and 8,865,789). In specific examples, the siloxane monomer comprises an acryl group. As used herein, a monomer comprising an "acryl group" has the structure of structure (1):

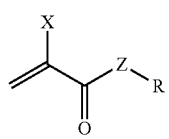

(1)

where X is hydrogen or a methyl group; Z is oxygen, sulfur, or nitrogen; and R is the remainder of the monomer. In one example, all siloxane monomers in the polymerizable composition comprise one or two acryl groups, and no other polymerizable group. In a further example, the polymerizable composition comprises a total amount of siloxane monomer of at least 20 wt. %, 30 wt. %, or 40 wt. % up to about 50 wt. %, 60 wt. % or 70 wt. %. As used herein, a given weight percentage (wt. %) is relative to the total weight of all polymerizable ingredients in the polymerizable composition; the weight of the polymerizable composition contributed by non-reactive components such as diluents is not included in the wt. % calculation. Throughout this disclosure, when a series of lower limit ranges and a series of upper limit ranges are provided, all combinations of the provided ranges are contemplated as if each combination were specifically listed. For example, in the above listing of weight percentages, all nine possible ranges of weight percentages are contemplated (i.e. 20 wt. % to 50 wt. %, 20 wt. % to 60 wt. % . . . 40 wt. % to 60 wt. %, and 40 wt. % to 70 wt. %). Further, throughout this disclosure, when a series of values is presented with a qualifier preceding the first value, the qualifier is intended to implicitly precede each value in the series unless context dictates otherwise. For example, for the weight percentages listed above, it is intended that the qualifier "at least" implicitly precedes each of the values 30 and 40, and the qualifier "to about" implicitly precedes each of 60 and 70.

The polymerizable composition also comprises a hydrophilic monomer, which is a water-soluble molecule that does not contain any siloxane groups and comprises a single polymerizable group. By comparison, a hydrophilic molecule containing two or more polymerizable groups and no siloxane group is referred to herein as a "cross-linking agent", as described further below. In a specific example, the hydrophilic monomer is a hydrophilic vinyl-containing monomer, which, as used herein, is any siloxane-free hydrophilic monomer having a single polymerizable carbon-carbon double bond (i.e., a vinyl group) present in its molecular structure that is not part of an acryl group (as defined by structure 1), where the carbon-carbon double bond of the vinyl group is less reactive than the carbon-carbon double bond present in a polymerizable methacrylate group (i.e. a group of structure 1 where X is a methyl group and R is oxygen) under free radical polymerization. Thus, while a carbon-carbon double bond is present in a monomer comprising a polymerizable methacrylate group, as used herein such monomers are not considered to be vinyl monomers. Examples of hydrophilic vinyl-containing monomers that can be used in the polymerizable composition include hydrophilic monomers having a single vinyl ether, or vinyl ester, or allyl ester, or vinyl amide polymerizable group. Exemplary hydrophilic vinyl-containing monomers include N-vinylacetamide, N-vinyl-N-methylacetamide (VMA), N-vinyl-N-ethylacetamide, N-vinyl-2-pyrrolidone (NVP), N-vinylformamide, N-vinyl-N-ethylformamide, N-vinyl isopropylamide, N-vinylcaprolactam, N-vinyloxycarbonyl-L-alanine, 1,4-butanediol vinyl ether (BVE), ethylene glycol vinyl ether (EGVE), diethylene glycol vinyl ether (DE-GVE), a poly(ethylene glycol) vinyl ether, or any combination thereof.

In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. In a specific example, the polymerizable composition comprises about 30 wt. % to 40 wt. % of a hydrophilic vinyl monomer. In a further example, the polymerizable composition comprises about 30 wt. % to 40 wt. % of a hydrophilic vinyl monomer and about 40 wt. % to 60 wt. % of a siloxane monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 10 wt. % VMA and 25 wt. % NVP and no other hydrophilic vinyl monomer, is said to comprise 35 wt. % hydrophilic vinyl monomer. In one example, the polymerizable composition comprises NVP in amounts of at least 10 wt. %, 15 wt. %, or 20 wt. %, and up to about 30 wt. %, 40 wt. %, or 50 wt. %. In a further example, the polymerizable composition comprises about 15 wt. % to about 40 wt. % NVP and about 5 wt. % to about 20 wt. % VMA.

The polymerizable composition may comprise a hydrophilic acryl monomer. As used herein, a "hydrophilic acryl monomer" is any hydrophilic siloxane-free monomer comprising a single acryl group of Structure 1, and no other polymerizable group. Exemplary hydrophilic acryl monomers include N,N-dimethylacrylamide, 2-hydroxyethyl methacrylate, ethoxyethyl methacrylamide, ethylene glycol methyl ether methacrylate, methyl methacrylate, 2-hydroxybutyl methacrylate, tert butyl methacrylate, isobornyl methacrylate, and combinations thereof. In one example, the polymerizable composition comprises from about 1 wt. % or 5 wt. % up to about 10 wt. %, 15 wt. %, 20 wt. %, or 25 wt. % of a hydrophilic acryl monomer. In another example, the polymerizable composition comprises a hydrophilic vinyl monomer and a hydrophilic acryl monomer at a weight ratio of at least 2 to 1, respectively.

The polymerizable composition may additionally comprise at least one cross-linking agent, which, as used herein, is a molecule having at least two polymerizable groups and no siloxane groups. The cross-linking agent may comprise acryl groups or vinyl groups, or both an acryl group and a vinyl group. A variety of cross-linking agents suitable for use in silicone hydrogel polymerizable compositions are known in the field (see, e.g., U.S. Pat. No. 8,231,218, incorporated herein by reference). Examples of cross-linking agents that can be used in the polymerizable compositions disclosed herein, include, without limitation, lower alkylene glycol di(meth)acrylates such as triethylene glycol dimethacrylate and diethylene glycol dimethacrylate; poly (lower alkylene) glycol di(meth)acrylates; lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth)acrylate; methylenebis(meth)acrylamide; triallyl phthalate; 1,3-Bis(3-methacryloxypropyl)tetramethyldisiloxane; diallyl phthalate; triallyl isocyanurate; and combinations thereof.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, a dye, an oxygen scavenger, a chain transfer agent, a diluent, or the like. In some examples, the polymerizable composition may include an organic diluent to minimize phase separation between the hydrophilic and hydrophobic components of the polymerizable composition. Diluents commonly used in contact lens formulations to reduce phase separation include hexanol, ethanol, and/or other alcohols. In other examples, the polymerizable composition is substantially free of an organic diluent. In such examples, the use of siloxane monomers containing hydrophilic moieties such as polyethylene oxide groups, pendant hydroxyl groups, or other hydrophilic groups, can improve compatibility of the siloxane monomer with the hydrophilic monomers of the polymerizable composition, making the addition of diluent unnecessary. Non-limiting examples of these and additional ingredients that may be included in the polymerizable composition are provided in U.S. Pat. No. 8,231,218.

The polymerizable composition is dispensed into a contact lens mold comprising a first lens-forming surface having a higher polarity than the second lens-forming surface, as described above, and cured (i.e. polymerized) using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, DAROCUR, or IRGACUR (available from Ciba Specialty Chemicals). Photopolymerization methods for contact lenses are described in, e.g., U.S. Pat. No. 5,760,100. In the case of heat-curing, also referred to as thermal curing, the polymerizable composition typically comprises a thermal initiator. Exemplary thermal initiators include 2,2'-azobis(2,4-dimethylpentanenitrile) (VAZO-52), 2,2'-Azobis(2-methylpropanenitrile) (VAZO-64), and 1,1'-azo bis(cyanocyclohexane) (VAZO-88). Thermal polymerization methods for contact lenses are described in, e.g., U.S. Pat. Nos. 8,231,218 and 7,854,866, which are incorporated herein by reference.

After curing, the resulting polymeric lens body is removed from the mold (delensed) and washed to extract any unreacted or partially reacted ingredients and to hydrate the lens. The washing step involves contacting the polymeric lens body with one or more volumes of one or more washing liquids. In some examples, a first volume of washing liquid is used to "wet" delens the lens from the mold. In other examples, the lens is "dry-delensed" from the mold using a mechanical method. In some examples, the washing liquid used to wash and hydrate the lens may comprise one or more volatile organic solvents (e.g., methanol, ethanol, chloroform, or the like). In other examples, the lens is washed and hydrated using only washing liquids that are free of volatile organic solvents. Thus, in one example, the washing step is conducted in the absence of liquids comprising volatile organic solvents.

After the curing step or washing step, the polymeric lens body may be subjected to a surface modification treatment to increase the wettability of the contact lens. In some examples, surface modification may be used to increase the wettability of the second surface of the contact lens. In other examples, surface modification may be used to increase wettability of both the first and second surfaces of the contact lens. A variety of surface modification methods for increasing the wettability of contact lens surfaces are known in the art. Examples include plasma treatment, attachment of hydrophilic polymers onto the polymeric lens body such as by a layer-by-layer technique, and addition of a hydrophilic polymer into the contact lens packaging solution. These and other methods of surface modification are known in the prior art (see e.g. U.S. Pat. Nos. 4,143,949, 7,582,327, and U.S. Pat. No. 7,841,716).

After washing, and any optional process step (e.g. surface modification), the hydrated polymeric lens body is placed into a blister package, glass vial, or other appropriate container, all referred to herein as "packages." Typically, packaging solution is also added to the container. Suitable packaging solutions include phosphate- or borate-buffered saline together with any optional additional ingredients such as a comfort agent, a medication, a surfactant to prevent the lens from sticking to its package, or the like. The package is sealed, and the sealed polymeric lens body is sterilized by radiation, heat or steam (e.g., autoclaving), gamma radiation, e-beam radiation, or the like. In some examples, the lens may be packaged under sterile conditions, making a post-packaging sterilization step unnecessary. In some examples, the polymeric lens body may be dry delensed, placed directly into its final package together with packaging solution, sealed, and optionally sterilized. Thus, the washing step may be concurrent with the packaging and sterilization steps. In a specific example, the polymeric lens body is sterilized by autoclaving.

Silicone hydrogel contact lenses manufactured by the methods described herein have unique physical properties that increase their comfort and help maintain the corneal health of the patient. The silicone hydrogel contact lens comprises a polymeric lens body that is the reaction product of a polymerizable composition comprising at least one siloxane monomer and at least one hydrophilic monomer. The silicone hydrogel contact lens comprises an optic zone that consists essentially of the reaction product of the polymerizable composition and any additional chemicals or molecules added to the lens after polymerization, such as by post polymerization surface modification, contact with packaging solution additives, etc. In other words, the silicone hydrogel contact lens comprises an optic zone that consists essentially of the silicone hydrogel. As used in this context, the term "consists essentially" means that the optic zone of the silicone hydrogel contact lens is substantially free of non-silicone hydrogel components that affect the ionoflux (i.e. that significantly reduce or increase the ionoflux) of the contact lens. Examples of non-silicone hydrogel components that may affect the ionoflux of a silicone hydrogel contact lens include variable optic inserts, such as liquid crystal lenses or meniscus lenses. Another example of a non-silicone hydrogel component is a non-silicone hydrogel layer of a composite or hybrid contact lens, such as a silicone elastomer layer. In specific examples, the silicone hydrogel contact lens is characterized by having an ionoflux of at least $1.0 \times 10^{-6}$ mm$^2$/min, $2.5 \times 10^{-6}$ mm$^2$/min, or $5.0 \times 10^{-6}$ mm$^2$/ min and up to about $0.1 \times 10^{-3}$ mm$^2$/min, $0.25 \times 10^{-3}$ mm$^2$/min, $0.5 \times 10^{-3}$ mm$^2$/min, $0.75 \times 10^{-3}$ mm$^2$/min, or $1.0 \times 10^{-3}$ mm$^2$/min.

Another advantageous property of the silicone hydrogel contact lenses described herein is that they have good wettability. In one example, the front surface and/or the back surface of the contact lens has a contact angle that is less than 50°, 45°, 40°, 35°, 30°, or 25°. As used herein, the contact angle of a contact lens surface is the sessile drop contact angle of the back surface of the lens (unless the front surface is specified) as measured by a DSA-100 Drop Shape Analysis System from Krüss, or equivalent analyzer, using the method described in Example 3 below. In a specific example, the silicone hydrogel contact lens has an ionoflux between $1.0 \times 10^{-6}$ mm$^2$/min and $0.5 \times 10^{-3}$ mm$^2$/min and a sessile drop contact angle of less than 45°. Curing the silicone hydrogel contact lens in a mold with lens-forming surfaces having different polarities, as described above, may result in a contact lens having front and back surfaces with different wetting properties. In one example, the front surface of the silicone hydrogel contact lens has a contact angle that is at least 10%, 20%, 30%, or 40% greater than the back surface contact angle. In another example, the back surface of the contact lens has a contact angle that is less than 30°.

In any of the above-described examples, the silicone hydrogel contact lens may have an evaporation rate of less than 20 mg/h, less than 18 mg/h, or less than 15 mg/h when measured at 21° C. to 23° C. at 38-40% RH from 0 to 4 hours. In a specific example, the silicone hydrogel contact lens has an evaporation rate of less than 15 mg/h when measured at 21° C. to 23° C. at 38-40% RH from 0 to 4 hours, and an ionoflux between $0.25 \times 10^{-6}$ mm$^2$/min and $0.5 \times 10^{-3}$ mm$^2$/min. In another example, the contact lens has an evaporation rate of less than 15 mg/h or less than 12 mg/h when measured at 21° C. to 23° C. at 48-50% RH from 2 to 4 hours, and an ionoflux between $0.25 \times 10^{-6}$ mm$^2$/min and $0.5 \times 10^{-3}$ mm$^2$/min.

In any of the above-described examples, the silicone hydrogel contact lens may have an equilibrium water content (EWC) of greater than about 30 wt. %, 40 wt. % or 50 wt. % and up to about 60 wt. % or 70 wt. %. To measure EWC, excess surface water is wiped off of the lens and the lens is weighed to obtain the hydrated weight. The lens is placed in an oven at 80° C. under a vacuum until completely dried and weighed. The weight difference is determined by subtracting the weight of the dry lens from the weight of the hydrated lens. The wt. % EWC of the lens is =(weight difference/hydrated weight)×100.

In any of the above described examples, the silicone hydrogel contact lens may have a modulus of about 0.2 MPa, 0.3 MPa, or 0.4 MPa, up to about 0.7 MPa, 0.8 MPa, or 0.9 MPa. As used herein, the modulus of a contact lens refers to the tensile modulus (i.e. Young's modulus) as measured using the method described in Example 4 below.

In any of the above-described examples, the silicone hydrogel contact lens may have an oxygen permeability (Dk) of at least 60, 80, or 100 barrers. As used herein, the Dk of a contact lens is determined in accordance with the American National Standards Institute (ANSI) Z80.20:2010, and International Organization for Standardization (ISO) 18369-4:2006, in a humidity-saturated environment at 35° C. using an oxygen permeometer from Createch/Rehder Development Co. (West Lafayette, Ind.).

The following Examples illustrate certain aspects and advantages of the present invention, which should be understood not to be limited thereby.

Example 1: Ionoflux Method

Three 250 mL water jacketed reaction beakers are placed on magnetic stir plates and connected in series to a common circulating bath. Each jacketed reaction beaker is filled with 80 mL deionized (DI) water and the circulating bath is turned on to achieve a temperature of 35.5°±0.5° C. Three 100 ml beakers (receiving chambers) with magnetic stir bars are filled with 80 mL water at about 40° C. and placed into each jacketed reaction beaker. Three calibrated conductivity meters (Horiba Model ES-51) and electrode cells (Horiba 3552-10D) are readied. Conductivity value at room temperature should be 1 µS/cm or less. A conductivity electrode is immersed into each receiving chamber.

Each contact lens is rinsed by removing it from its original packaging solution, placing it in a beaker with 30 mL of DI water at room temperature for 10 minutes, and placing it in 30 mL of fresh deionized water for an additional 10 minutes. The thickness of each rinsed lens is measured using a Rehder gauge Model ET-3 (West Lafayette, Ind.) at the following five angles: 0, ±12°, ±16°, and the average thickness is taken to be the thickness of the lens. Each lens is then placed in a lens-retaining device of a donor chamber. Referring to FIG. 1, the donor chamber comprises a 30 ml clear glass vial, 1, with an open end, 2, and a threaded tapered end, 3, adapted to receive a threaded cap, 4. The center of the cap has an 8.5 mm diameter circular opening. The rinsed contact lens, 5, is mounted on a 14.2 mm diameter silicone O-ring, 6, having an 8.5 mm central opening (i.e. inner diameter), such that the perimeter of the back surface of the contact lens rests on top of the O-ring. If the diameter of the contact lens is greater than 14.2 mm it is trimmed with a 9/16 (~14.2 mm) punch prior to placement on the O-ring. The O-ring is then placed on the threaded end of the donor chamber. The threaded cap, 4, is manually tightened onto the donor chamber until a torque of 1.9±0.1 N·cm is achieved to insure uniformity of tightness and adequate seal without damage to the lens. Torque is determined using a torque meter (IMADA DTX2-2B with 25 N·cm capacity and 0.1 N·cm resolution). The donor chamber is turned upside down, as depicted in FIG. 1, and filled with 5 mL DI water. The bottom (capped end) of the donor chamber is wiped to check for water leaks. If necessary, the lens and cap are re-assembled until no leakage is observed. Once a leak-free seal is obtained the DI water is removed from the donor chamber and the donor chamber is placed into the receiving chamber, ensuring that no air bubbles are retained against the lens. 16 mL of 0.1 M sodium chloride solution, 7, is added to the donor chamber. The level of the sodium chloride solution is adjusted to the same level of the water inside the receiving chamber by moving the donor chamber up or down using a clamp. The electrode is adjusted using a clamp to ensure that the ion junction is level with the lens assembly. Conductivity is recorded for 20 minutes while the temperature inside the receiving chamber is 35.0±0.5° C.

Ionoflux is calculated for each lens by applying Fick's law of diffusion as follows: $D = -n'/(A \times dc/dx)$, where n'=rate of ion transport (mol/min), A=area of lens exposed (mm2), dc=concentration difference (mol/L), and dx=thickness of lens (mm), and D is the ionoflux diffusion coefficient, or simply "ionoflux". The average ionoflux value of the three lenses is taken to be the ionoflux of the contact lens.

Example 2: Evaporation Rate Method

A threaded cap with the same configuration as described above for the ionoflux method is used to secure a contact lens that has been rinsed as described in Example 1. The cap is threaded onto a closed-ended 5 ml glass vial (as opposed to a 30 ml open-ended vial as described for the ionoflux method) containing 1 ml PBS. As used herein, PBS refers to a phosphate buffered saline consisting of 0.83 wt. % NaCl, 0.03 wt. % sodium phosphate monobasic, and 0.24 wt. % sodium phosphate dibasic having a pH of 7.3. The capped vial is checked for leaks as described above and reassembled if necessary to achieve a leak-free seal. Care is taken to ensure that the rinsed contact lens is promptly assembled with the cap and vial so that it remains fully hydrated when the lens/vial assembly is first weighed. A rack for 5 ml glass vials is placed on an analytical scale and the scale is tared to read zero. The capped vial is inverted (i.e. lens facing down) and carefully placed on the rack so as to ensure that the lens is not touched. Once placed in the rack, the weight of the capped vial is measured, and taken to be the weight at time=0 hours. The weight of the capped vial is measured again at times 30, 60, 120 and 240 min, ensuring that the temperature is maintained within a 2° C. range (e.g. 21° C. to 23° C.) and the relative humidity is maintained within a 2% range (e.g. 38-40% RH) during the duration of the testing. The evaporation rate for a given time range equals the weight at the beginning of the time period minus the weight at the end of the time period, divided by the time period. The average evaporation rate of the three lenses is taken to be the evaporation rate of the contact lens. Thus, if a lens/vial set up has the following weights at the time points shown in the table:

| Time (min) | Weight (mg) | Difference from $T_0$ |
|---|---|---|
| 0 | 1000 | 0 mg |
| 30 | 990 | 10 mg |
| 60 | 985 | 15 mg |
| 120 | 970 | 30 mg |
| 240 | 960 | 40 mg |

Then,

Evaporation rate from 0 to 2 hr=30 mg/2 hr=15 mg/hr

Evaporation rate from 2 to 4 hr=(40 mg-30 mg)/2 hr=5 mg/hr

Evaporation rate from 0 to 4 hr=40 mg/4 hr=10 mg/hr.

Example 3: Contact Angle Measurement

To determine the contact angle of a contact lens surface, contact lenses to be tested are soaked in PBS for at least 12 hours. Using rubber tipped tweezers, the lenses are removed from the PBS and shaken to remove excess water. A 4 mm diameter section of each lens is cut with a lens cutter. The surface of the contact lens section to be tested is blotted dried by placing it face down on a microscope lens wipe and gently dragging the lens section across the wipe using rubber tipped tweezers until no liquid is observed absorbing into the wipe. The lens section is placed on a microscope slide, ensuring that it lies flat with the blotted surface facing upwards. Measurements are taken promptly to ensure that the lens section does not become dry (as evidenced by deformation of the lens section). The DSA-100, open the Drop Shape Analysis program is turned on and the "Sessile drop (VCA eq)" method is selected with the following settings: camera tilt=+2; Zoom=9; 100 µl syringe with straight needle; dispense solution=purified water; dispense volume=0.75 µl; dispense speed=7.5 µl/min; and dispense mode=volume. The microscope slide is placed on the sample stage so that the longer side of the lens section is perpendicular to the camera. The syringe is moved to fit in the viewing screen and the image is adjusted until a maximum is reached in the median window. The water is dispensed onto the lens. Between 10 to 15 seconds after dispensing the water, the image of the drop is captured. A calculation method is selected according to the contact angle as follows: <30°=Circle Fitting Method, 30°-130°=Tangent Method-1; >130°=Tangent Method-2. The average contact angle measurement of 5 lens sections is taken to be the contact angle for the particular surface (i.e. posterior or anterior) of the contact lens.

Example 4: Modulus Measurement

Young's modulus is determined by an ANSI Z80.20 standard using an Instron Model 3342 or Model 3343 mechanical testing system (Instron Corporation, Norwood, Mass., USA) and Bluehill Materials Testing Software. The contact lens to be tested is soaked in 4 mL phosphate buffered saline (PBS) for 30 minutes prior to testing. While holding the lens concave side up, a central strip of the lens is cut using a contact lens cutting die having clean and sharp blades to provide a 4 mm wide generally rectangular strip of the material that is defect-free along the cutting edges. The length of the strip is about 14-15 mm, that is, about the diameter of the contact lens before being cut. The thickness of the strip is measured using a calibrated gauge (for example, Rehder electronic thickness gauge, Rehder Development Company, Castro Valley, Calif., USA) at the following angles: −8°, −4°, 0°, 4°, and 8°. The average of the 5 measurements is taken without correcting the values for compression of the sample. Using tweezers, the strip is loaded into the grips of the calibrated Instron apparatus, with the strip fitting over at least 75% of the grip surface of each grip; the gap distance between the grips is 5.0 mm. The modulus is determined inside a humidity chamber having a relative humidity of at least 70% at room temperature (about 22° C.) at a pull rate of 10.00 mm/min. The modulus is defined as the beginning upward slope of the recorded curve.

Example 5: Preparation of Dual Surface Contact Lenses

A premix composition was prepared by combining the following ingredients: less than 1 wt. % sodium dioctyl sulfosuccinate, less than 1 wt. % triallyl isocyanurate, about 53 wt. % N-vinyl-2-pyrrolidone, about 11 wt. % isobornyl methacrylate, about 18 wt. % 2-hydroxybutyl methacrylate, and about 18 wt. % N-vinyl-N-methylacetamide. A polymerizable composition was prepared by combining about 51 wt. % of the premix composition with about 9 wt. % of a siloxane monomer having a molecular weight of about 1300, referred to as FMM (CAS #697234-76-7) and about 40 wt. % of a silicone macromer having a molecular weight of about 15000, referred to as M3U (CAS #697234-74-5). The structures of these siloxanes are provided in U.S. Pat. No. 7,750,079, incorporated herein by reference.

The polymerizable composition was UV-cured in polypropylene contact lens molds having a hydrophilic coating on the lens-forming surface of the male mold member. The female lens mold member was uncoated. The male molds were coated by wetting their lens-forming surfaces with a solution of 10% PVOH in water, spinning the male mold member for about 20 seconds at 8,800 RPM, and drying the male molds at room temperature between 1-24 hours prior to use. After curing, the lenses were manually removed from the molds, hydrated in a hot (90° C.) bath of deionized water for 30 minutes. The contact lenses were then extracted by soaking them in three exchanges of industrial methylated spirits (IMS) containing about 95% ethanol and 5% methanol for 45 min each soak (i.e. approx. 135 min. total). The lenses were then soaked in three exchanges of 50% IMS+ 50% DI water, and finally three exchanges of DI water. Control lenses were made using the same polymerizable composition and same method, except that both the male and female lens mold members were coated with the PVOH.

To increase the wettability of the front of the lens which was molded by the uncoated polypropylene female mold member, some of the lenses were soaked in two exchanges of a solution of 0.5% polyacrylic acid (PAA; ave. MW=250,000) in water with pH=2.0 for 20 minutes each soak, followed by soaking in two exchanges of PBS for 5 minutes each soak. The lenses were then packaged in contact lens blisters containing PBS, sealed, and autoclaved.

The ionoflux and the evaporation rates of dual surface lenses with and without PAA treatment, as well as control lenses, were determined using the methods described above. The evaporation rates were tested using a humidity chamber at 48-50% RH and temperature of 21° C. to 23° C., and evaporation rates from 2 to 4 hours were calculated. The results are shown in Table 1.

TABLE 1

| Lens | PAA Treated? | Evaporation Rate (mg/hr) | Ionoflux (mm$^2$/min) |
|---|---|---|---|
| Dual Surface | Yes | 10.0 ± 1.0 | 0.09 × 10$^{-3}$ |
| Dual Surface | No | 11.7 ± 2.5 | 0.12 × 10$^{-3}$ |
| Control | Yes | 17.7 ± 1.0 | 4.17 × 10$^{-3}$ |
| Control | No | 17.8 ± 1.0 | 4.03 × 10$^{-3}$ |

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The present invention includes the following aspects/embodiments/features in any order and/or in any combination:

1. A method of manufacturing a silicone hydrogel contact lens comprising:
   a. providing a contact lens mold comprising a first lens-forming surface to mold one side of said hydrogel contact lens and a second lens-forming surface to mold opposite side of said hydrogel contact lens, wherein the first lens-forming surface has a higher polarity than the second lens-forming surface;
   b. curing a polymerizable composition comprising at least one siloxane monomer and at least one hydrophilic monomer in the contact lens mold to form a polymeric lens body;
   c. hydrating the polymeric lens body to provide a silicone hydrogel contact lens having a first surface formed by the first lens-forming surface of the contact lens mold and a second surface formed by the second lens-forming surface of the contact lens mold; and
   d. sealing the silicone hydrogel contact lens in a package, wherein the silicone hydrogel contact lens has a lower ionoflux and/or a lower evaporation rate than a control contact lens manufactured by an identical method except that the second lens-forming surface has the same polarity as the first lens-forming surface.

2. The method of any preceding or following embodiment/feature/aspect, wherein the first lens-forming surface has a contact angle that is at least 20° lower than the contact angle of the second lens forming surface.

3. The method of any preceding or following embodiment/feature/aspect, wherein the first lens-forming surface is polar and the second lens-forming surface is non-polar.

4. The method of any preceding or following embodiment/feature/aspect, wherein the first lens-forming surface comprises a non-polar thermoplastic material coated with a hydrophilic coating, and wherein the second lens-forming surface comprises the non-polar thermoplastic material in the absence of any polarity-enhancing surface coating or treatment.

5. The method of any preceding or following embodiment/feature/aspect, wherein the at least one hydrophilic monomer is a hydrophilic vinyl-containing monomer.

6. The method of any preceding or following embodiment/feature/aspect, wherein the polymerizable composition comprises a total amount of hydrophilic vinyl-containing monomer of about 20 wt. % to about 60 wt. % based on the total weight of all polymerizable ingredients in the polymerizable composition.

7. The method of any preceding or following embodiment/feature/aspect, where the at least one hydrophilic vinyl-containing monomer is selected from N-vinylacetamide, N-vinyl-N-methylacetamide (VMA), N-vinyl-N-ethylacetamide, N-vinyl-2-pyrrolidone (NVP), N-vinylformamide, N-vinyl-N-ethylformamide, N-vinyl isopropylamide, N-vinylcaprolactam, N-vinyloxycarbonyl-L-alanine, 1,4-butanediol vinyl ether, ethylene glycol vinyl ether, diethylene glycol vinyl ether, a poly(ethylene glycol) vinyl ether, or any combination thereof.

8. The method of any preceding or following embodiment/feature/aspect, wherein the hydrophilic vinyl-containing monomer is VMA, or NVP, or a combination of both VMA and NVP.

9. The method of any preceding or following embodiment/feature/aspect, wherein the polymerizable composition comprises a total amount of siloxane monomer of about 30 wt. % to about 60 wt. % based on the total weight of all polymerizable ingredients in the polymerizable composition.

10. The method of any preceding or following embodiment/feature/aspect, wherein after the curing step the polymeric lens body is subjected to a surface modification treatment to increase wettability of the second surface of the silicone hydrogel contact lens.

11. The method of any preceding or following embodiment/feature/aspect, wherein the surface modification treatment is selected from air plasma, or UV-ozone, or corona discharge.

12. The method of any preceding or following embodiment/feature/aspect, wherein the contact lens has an equilibrium water content (EWC) of at least 40%.

13. The method of any preceding or following embodiment/feature/aspect, wherein the contact lens has an ionoflux of less than 0.5×10$^{-3}$ mm$^2$/min, and the control contact lens has an ionoflux of at least 1×10$^{-3}$ mm$^2$/min.

14. The method of any preceding or following embodiment/feature/aspect, wherein the contact lens has a lower evaporation rate from 2 to 4 hours than the control lens, wherein the evaporation rate measured at 48-50% RH and 21° C. to 23° C.

15. The method of any preceding or following embodiment/feature/aspect, wherein the evaporation rate is less than 15 mg/h.

16. The method of any preceding or following embodiment/feature/aspect, wherein the first surface of the contact lens has a sessile drop contact angle that is less than that of the second surface of the contact lens.

17. The method of any preceding or following embodiment/feature/aspect, wherein the contact lens has a back surface having a contact angle of less than 45°.

18. The method of any preceding or following embodiment/feature/aspect, wherein the first surface of the contact lens is a back surface.

19. The method of any preceding or following embodiment/feature/aspect, wherein the first surface of the contact lens is a front surface.

20. A silicone hydrogel contact lens comprising a polymeric lens body that is the reaction product of a polymerizable composition comprising at least one siloxane monomer and at least one hydrophilic monomer, wherein the silicone hydrogel contact lens has an ionoflux between $1.0 \times 10^{-6}$ $mm^2/min$ and $0.5 \times 10^{-3}$ $mm^2/min$ and a) a back surface contact angle of less than 45°, or b) an evaporation rate of less than 15 mg/h when measured at 21° C. to 23° C. at 48-50% RH for 2 to 4 hours, or 3) both a back surface contact angle of less than 45° and an evaporation rate of less than 15 mg/h when measured at 21° C. to 23° C. at 48-50% RH for 2 to 4 hours, wherein the silicone hydrogel contact lens comprises an optic zone that consists essentially of the silicone hydrogel.

21. The silicone hydrogel contact lens of any preceding or following embodiment/feature/aspect, having a back surface contact angle of less than 45°.

22. The silicone hydrogel contact lens of any preceding or following embodiment/feature/aspect, wherein the back surface contact angle is less than 30°.

23. The silicone hydrogel contact lens of any preceding or following embodiment/feature/aspect, having an evaporation rate of less than 15 mg/h when measured at 24° C. at 49-50% RH for 2 to 4 hours.

24. The silicone hydrogel contact lens of any preceding or following embodiment/feature/aspect, wherein the evaporation rate is less than 12 mg/h.

25. The silicone hydrogel contact lens of any preceding or following embodiment/feature/aspect, wherein the ionoflux is less than $0.1 \times 10^{-3}$ $mm^2/min$.

26. The silicone hydrogel contact lens of any preceding or following embodiment/feature/aspect, having a front surface contact angle that is at least 10% greater than the back surface contact angle.

27. The silicone hydrogel contact lens of any preceding or following embodiment/feature/aspect, wherein the at least one hydrophilic monomer is a hydrophilic vinyl-containing monomer.

28. The silicone hydrogel contact lens of any preceding or following embodiment/feature/aspect, where the at least one hydrophilic vinyl-containing monomer is selected from N-vinylacetamide, N-vinyl-N-methylacetamide (VMA), N-vinyl-N-ethylacetamide, N-vinyl-2-pyrrolidone (NVP), N-vinylformamide, N-vinyl-N-ethylformamide, N-vinyl isopropylamide, N-vinylcaprolactam, N-vinyloxycarbonyl-L-alanine, 1,4-butanediol vinyl ether, ethylene glycol vinyl ether, diethylene glycol vinyl ether, a poly(ethylene glycol) vinyl ether, or any combination thereof.

29. The silicone hydrogel contact lens of any preceding or following embodiment/feature/aspect having an EWC of at least 30%.

30. The silicone hydrogel contact lens of any preceding or following embodiment/feature/aspect wherein the EWC is about 40% to about 60%.

31. The silicone hydrogel contact lens of any preceding or following embodiment/feature/aspect having a modulus about 0.3 MPa up to about 0.9 MPa.

32. The silicone hydrogel contact lens of any preceding or following embodiment/feature/aspect having a Dk of at least 80 barrers.

33. The silicone hydrogel contact lens of any preceding or following embodiment/feature/aspect that is sterile and sealed a package.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of manufacturing a silicone hydrogel contact lens comprising:
    a) providing a contact lens mold comprising a first lens-forming surface to mold one side of said hydrogel contact lens and a second lens-forming surface to mold opposite side of said hydrogel contact lens, wherein the first lens-forming surface has a higher polarity than the second lens-forming surface;
    b) curing a polymerizable composition comprising at least one siloxane monomer and at least one hydrophilic monomer in the contact lens mold to form a polymeric lens body;
    c) hydrating the polymeric lens body to provide a silicone hydrogel contact lens having a first surface formed by the first lens-forming surface of the contact lens mold and a second surface formed by the second lens-forming surface of the contact lens mold; and
    d) sealing the silicone hydrogel contact lens in a package, wherein the silicone hydrogel contact lens has a lower ionoflux and/or a lower evaporation rate than a control contact lens manufactured by an identical method except that the second lens-forming surface has the same polarity as the first lens-forming surface, and wherein after the curing step the polymeric lens body is subjected to a surface modification treatment to increase wettability of the second surface of the silicone hydrogel contact lens, and the surface modification treatment is selected from air plasma, or UV-ozone, or corona discharge.

2. The method of claim 1, wherein the first lens-forming surface has a contact angle that is at least 20° lower than the contact angle of the second lens forming surface.

3. The method of claim 1, wherein the first lens-forming surface is polar and the second lens-forming surface is non-polar.

4. The method of claim 1, wherein the first lens-forming surface comprises a non-polar thermoplastic material coated with a hydrophilic coating, and wherein the second lens-forming surface comprises the non-polar thermoplastic material in the absence of any polarity-enhancing surface coating or treatment.

5. The method of claim 1, wherein the at least one hydrophilic monomer is a hydrophilic vinyl-containing monomer.

6. The method of claim 1, wherein the polymerizable composition comprises a total amount of hydrophilic vinyl-containing monomer of about 20 wt) % to about 60 wt) % based on the total weight of all polymerizable ingredients in the polymerizable composition.

7. The method of claim 5, where the at least one hydrophilic vinyl-containing monomer is selected from N-vinylacetamide, N-vinyl-N-methylacetamide (VMA), N-vinyl-N-ethylacetamide, N-vinyl-2-pyrrolidone (NVP), N-vinylformamide, N-vinyl-N-ethylformamide, N-vinyl isopropylamide, N-vinylcaprolactam, N-vinyloxycarbonyl-L-alanine, 1,4-butanediol vinyl ether, ethylene glycol vinyl ether, diethylene glycol vinyl ether, a poly(ethylene glycol) vinyl ether, or any combination thereof.

8. The method of claim 7, wherein the hydrophilic vinyl-containing monomer is VMA, or NVP, or a combination of both VMA and NVP.

9. The method of claim 1, wherein the polymerizable composition comprises a total amount of siloxane monomer of about 30 wt) % to about 60 wt) % based on the total weight of all polymerizable ingredients in the polymerizable composition.

10. The method of claim 1, wherein the contact lens has an equilibrium water content (EWC) of at least 40%.

11. The method of claim 1, wherein the contact lens has an ionoflux of less than $0.5 \times 10^{-3}$ mm$^2$/min, and the control contact lens has an ionoflux of at least $1 \times 10^{-3}$ mm$^2$/min.

12. The method of claim 1, wherein the contact lens has a lower evaporation rate from 2 to 4 hours than the control lens, wherein the evaporation rate measured at 48-50% RH and 21° C.) to 23° C.

13. The method of claim 12, wherein the evaporation rate is less than 15 mg/h.

14. The method of claim 1, wherein the first surface of the contact lens has a sessile drop contact angle that is less than that of the second surface of the contact lens.

15. The method of claim 1, wherein the contact lens has a back surface having a contact angle of less than 45°.

16. The method of claim 1, wherein the first surface of the contact lens is a back surface.

17. The method of claim 1, wherein the first surface of the contact lens is a front surface.

* * * * *